US008013293B2

(12) United States Patent
Yamauchi et al.

(10) Patent No.: US 8,013,293 B2
(45) Date of Patent: Sep. 6, 2011

(54) TIME-OF-FLIGHT MASS SPECTROMETER

(75) Inventors: Kazuo Yamauchi, Ibaraki (JP); Takao Okado, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 115 days.

(21) Appl. No.: 12/601,949

(22) PCT Filed: Apr. 14, 2008

(86) PCT No.: PCT/JP2008/000981
§ 371 (c)(1),
(2), (4) Date: Nov. 25, 2009

(87) PCT Pub. No.: WO2008/146440
PCT Pub. Date: Dec. 4, 2008

(65) Prior Publication Data

US 2010/0176292 A1 Jul. 15, 2010

(30) Foreign Application Priority Data

May 30, 2007 (JP) ................................ 2007-142729

(51) Int. Cl.
*H01J 49/40* (2006.01)
*B01D 59/44* (2006.01)

(52) U.S. Cl. ..... 250/287; 250/300; 250/429; 250/443.1; 250/396 R; 250/397

(58) Field of Classification Search .................. 250/287, 250/300, 429, 443.1, 396 R, 397
See application file for complete search history.

(56) References Cited

U.S. PATENT DOCUMENTS 6,456,095 B1 * 9/2002 Sorita et al. .................. 324/703
6,700,118 B2 * 3/2004 Yefchak et al. ............... 250/287

FOREIGN PATENT DOCUMENTS

| | | | |
|---|---|---|---|
| JP | 4-55752 | A | 2/1992 |
| JP | 5-217548 | A | 8/1993 |
| JP | 7-240170 | A | 9/1995 |
| JP | 10-112282 | A | 4/1998 |
| JP | 10-223174 | A | 8/1998 |
| JP | 2004-170155 | A | 6/2004 |
| JP | 2006-140064 | A | 6/2006 |
| JP | 2008-511964 | A | 4/2008 |
| JP | 2008-157671 | A | 7/2008 |
| WO | 2006/026391 | A1 | 3/2006 |

* cited by examiner

*Primary Examiner* — Nikita Wells
(74) *Attorney, Agent, or Firm* — Sughrue Mion, PLLC

(57) ABSTRACT

A shift of mass axis that occurs when the temperature of a vacuum container consisting of a vacuum chamber (15) and IT block (16) or that of a TOF power unit (20) for applying an ion acceleration voltage is changed, is respectively measured beforehand, and parameters expressing a transfer function based on its response are stored in a transfer function memory (24). During an analysis, a mass shift predicting operation section (25) estimates the current shift length of the mass axis from the current temperatures of the IT block (16) and TOF power unit (20) obtained by first and second temperature sensors (34 and 35) as well as from the two transfer functions stored in the memory (24). A mass shift correcting section (29) corrects the mass axis of the mass spectrum according to the estimated shift length. Thus, if the ambient temperature suddenly changes, the shift of the mass axis of the mass spectrum due to the temperature change is corrected with high accuracy, so that a mass spectrum with a high level of mass accuracy can be created.

7 Claims, 3 Drawing Sheets

23 ANALYSIS CONTROLLER
TRANSFER FUNCTION MEMORY
MASS SHIFT PREDICTING SECTION
ABNORMALITY DETERMINING SECTION
ANNUNCI-ATOR
TEMPERATURE CONTROLLER
MASS SHIFT COR-RECTING SECTION
DATA PROCESSOR
IT POWER UNIT
IT CONTROL CIRCUIT
TOF POWER UNIT
HEATER
SAMPLE LIQUID
EVACUATE
EVACUATE
EVACUATE
EVACUATE
EVACUATE
1
2
3
4
5
6
7
8
9
10
11
12
13
14
15
16
17
20
21
22
24
25
26
27
28
29
30
31
32
34
35
36
37

TIME-OF-FLIGHT MASS SPECTROMETER

TECHNICAL FIELD

The present invention relates to a time-of-flight mass spectrometer (TOFMS).

BACKGROUND ART

In a time-of-flight mass spectrometer (which is hereinafter abbreviated to TOFMS), various ions that have been almost simultaneously accelerated by an electric field are introduced into a flight space formed within a flight tube. Those ions are subsequently separated into different kinds of ions having different masses (or m/z, to be exact) according to their time of flight, i.e. the time required for each ion to travel through the flight space until it reaches the detector. The detector continuously produces detection signals corresponding to the amount of the incoming ions. Therefore, after converting the time-of-flight to the mass, it is possible to create a mass spectrum with the abscissa axis as the mass axis and the coordinate axis as the signal intensity axis.

In the TOFMS, the flight distance of the ions can slightly change due to a mechanical expansion or contraction due to a temperature change of the flight tube. This leads to a variation in the time of flight of the ions having the same mass, which causes a shift of the mass axis of the mass spectrum. If the temperature change of the flight tube is large, the aforementioned shift of the mass axis may possibly exceed the specified mass accuracy of the apparatus. To avoid this situation, the flight tube of conventional types of TOFMS are contained in a vacuum chamber placed within a thermostatic bath (or temperature-controlled casing) with an aim to suppress the temperature change of the flight tube by controlling the temperature of the entire vacuum chamber. (For example, refer to Patent Documents 1 and 2.)

However, even if the temperature of the vacuum chamber is controlled, the temperature control of the vacuum chamber may be disordered by a sudden change in the ambient temperature or other factors, which can consequently cause a shift of the mass axis. Therefore, it is necessary to estimate, in real time, the shift length of the mass axis in some way and invite the users' attention if the shift is likely to exceed a tolerance level.

An appropriate method for estimating the shift length of the mass axis due to the aforementioned factors is to directly monitor the temperature of the flight tube and estimate the shift length of the mass axis from the monitored values. However, it is difficult to attach a temperature sensor to the flight tube to directly monitor its temperature, because flight tubes are generally used as an accelerating electrode for initially accelerating the ions and hence need to be supplied with a high voltage of several kV or higher and placed in a vacuum atmosphere within a vacuum chamber. Given this problem, a temperature sensor is normally attached on the external surface of the vacuum chamber exposed to the air inside the thermostatic bath, and the shift length of the mass axis is estimated from the temperature of the vacuum chamber monitored with the temperature sensor.

However, it is inevitable that the actual temperature change of the flight tube has a relatively large response delay from the monitored temperature of the vacuum chamber since the heat capacity of the flight tube is generally large and the thermal conductivity of the vacuum atmosphere is intrinsically low. If the shift length of the mass axis is determined on the assumption that the value monitored with the temperature sensor attached to the vacuum chamber equals the temperature of the flight tube, the determination result may be erroneous. Consequently, an analysis result that actually contains a significant mass shift may be mistaken for an accurate result and adopted. Conversely, an actually correct analysis result may be mistaken for a poorly accurate one and discarded.

For such problems, the applicant of the present patent application has proposed a new type of TOFMS in the Japanese Patent Application No. 2006-344370. In this TOFMS, a step response of the shift length of the mass axis, which occurs when the temperature of the vacuum chamber is changed in a step-like form, is measured beforehand, and parameters that express a transfer function based on this step response are stored in a memory unit. Using this transfer function stored in the memory unit and the monitored temperature of the vacuum chamber obtained in real time during the analysis, the current shift length of the mass axis is estimated. By this method, it is possible to estimate the shift length of the mass axis more precisely than ever before and invite users' attention by an annunciation unit if the shift length of the mass axis exceeds a tolerance level.

The shift length of the mass axis estimated in the previously described manner can also be used to correct the mass axis of the mass spectrum and thereby improve the mass accuracy of the spectrum. However, the required level of mass accuracy varies depending on the purpose of the analysis and other factors; it is in some cases necessary to achieve higher levels of mass accuracy that cannot be achieved by the mass axis correction based on the previously described estimating operation.

Patent Document 1: Japanese Unexamined Patent Application Publication No. 2004-170155

Patent Document 2: Japanese Unexamined Patent Application Publication No. 2006-140064

DISCLOSURE OF THE INVENTION

Problem to be Solved by the Invention

The present invention has been developed to solve the aforementioned problems, and its objective is to provide a time-of-flight mass spectrometer capable of obtaining a mass spectrum with a high level of mass accuracy by reducing the influence of a temperature fluctuation even in the case of a sudden change in the environmental temperature.

Means for Solving the Problems

An experiment conducted by the present inventors have confirmed that a slight fluctuation of the shift of the mass axis remains for a considerably long span of time (e.g. on the order of 10 hours) when the mass axis is corrected using a shift length estimated in view of only the aforementioned transfer function that shows a response of the shift length of the mass axis to the vacuum chamber's temperature. This long-time fluctuation is most likely attributable to some factors other than mechanical ones, such as the expansion and contraction of the flight tube due to a temperature change. Particularly, in the case of the TOFMS, a non-mechanical factor that can affect the shift of the mass axis is presumably the fluctuation in the initial acceleration energy of the ion, i.e. the temperature characteristic of a power unit that applies a high voltage to the accelerating electrode for accelerating the ions. Based on this presumption, the present inventor has experimentally confirmed that the estimation accuracy of the mass axis can be further improved by additionally taking into account a transfer function that shows the response of the shift of the mass axis to the temperature change of the power unit for applying a high voltage to the accelerating electrode. Thus, the present invention has been devised.

The present invention aimed at solving the aforementioned problems is a time-of-flight mass spectrometer in which a mass separation unit forming a flight space designed for ions to fly through, an accelerating electrode for initially accelerating the ions and a detector for detecting the ions are provided within an evacuated vacuum container, where the ions that are initially accelerated by the accelerating electrode and temporally separated according to their mass by flying through the flight space are detected by the detector and a mass spectrum having a mass axis and an intensity axis is created from the detection signal of the ion detector, which is characterized by including:

a) a first temperature detecting means for detecting the temperature of the vacuum container;

b) a second temperature detecting means for detecting the temperature of a power unit for applying a voltage to the accelerating electrode;

c) a first memory means for storing information based on the result of a previous measurement relating to a transfer function from the temperature change of the vacuum container and the shift of the mass axis due to a temperature change of the mass separation unit;

d) a second memory means for storing information based on the result of a previous measurement relating to a transfer function from the temperature change of the power unit and the shift of the mass axis due to the temperature characteristic of the output of the power unit; and e) an estimating operation means for estimating the current shift length of the mass axis by using current temperatures of the vacuum chamber and the power unit obtained with the first temperature detecting means and the second temperature detecting means as well as information relating to the transfer functions stored in the first memory means and the second memory means, respectively.

The initial acceleration of the ions is determined by the potential difference between the ion-ejecting section and the inside of the flight space (e.g. the inside of the flight tube). Therefore, the accelerating electrode may be an electrode provided at the ion-ejecting section or the flight tube itself.

Each of the two transfer functions can be respectively obtained by measuring a step response of the shift length of the mass axis of the mass spectrum to a sudden change (e.g. a substantially step-like change) in the temperature of the vacuum container or power unit. The step response of the shift length of the mass axis can be determined, for example, by repeatedly performing a mass analysis of an ion with a specific mass and keeping track of the mass determined by the analysis. With respect to these transfer functions, one can assume that identically structured apparatuses have only negligible individual differences. Accordingly, it is unnecessary to measure the step response for every apparatus; a measurement result obtained for one standard apparatus is also applicable to the other apparatuses.

The transfer functions can be represented by Laplace transformations. On a computer (i.e. discrete system), they can be represented as a digital filter (low-pass filter) having a specific time constant. More specifically, an experimentally obtained transfer function (Laplace transformation) is converted to a pulse transfer function (z-transformation) of a discrete system by a bilinear z-transformation. From the form of the obtained pulse transfer function, a differential equation of the discrete system is derived, with the temperature of either the vacuum container or power unit as the input and the shift length of the mass axis as the output. It is possible to presume that the shift of the mass axis due to a temperature change of the vacuum container and that due to a temperature change of the power unit are totally independent of each other. Accordingly, a total mass-shift length due to the two factors can be obtained by summing up the mass-shift lengths separately estimated in the aforementioned manner. Thus, it is possible to accurately estimate, in real time, a possible mass-shift length of the mass spectrum on the basis of the detection results of the temperatures of both the vacuum container and the power unit for ion acceleration.

It is preferable for the time-of-flight mass spectrometer according to the present invention to further include a data processing means for creating a mass spectrum with a corrected mass axis, using the shift length of the mass axis estimated by the estimating operation means. This configuration enables the apparatus to create a mass spectrum with a high level of mass accuracy free from the effects of sudden changes in the environmental temperature or other factors.

The time-of-flight mass spectrometer according to the present invention may further include an annunciating means for informing users if the shift length of the mass axis estimated by the estimating operation means exceeds a predetermined tolerance level. For example, the annunciating means may use a display or sound for annunciation.

In this case, if the shift length of mass axis of the mass spectrum has exceeded the specified mass accuracy of the apparatus during an analysis, or if the mass axis has been too much shifted to be corrected by the previously described method, users can immediately recognize the situation and take appropriate measures, such as discarding the obtained results, suspending the analysis or checking the apparatus for a problem.

Effects of the Invention

The time-of-flight mass spectrometer according to the present invention is capable of accurately estimating the shift length of the mass axis of a mass spectrum due to a change in the environmental temperature without directly measuring the temperature of the flight tube which is contained in a vacuum container and supplied with a high voltage. Thus, it is possible, for example, to obtain mass spectrums with high levels of mass accuracy.

To suppress the shift of the mass axis against changes in the environmental temperature, it has been conventionally necessary, for example, to select materials having a low coefficient of thermal expansion for the flight tube, use selected parts to reduce the temperature characteristics of the power unit, and provide the power unit with a temperature compensating circuit. Otherwise, it was necessary to take some other measures, such as containing the apparatus in a thermostatic bath capable of creating a controlled temperature condition that is barely affected by a sudden change in the environmental temperature. Any of these measures is very expensive and increases the price of the apparatus. Such hardware-based measures are less necessary (though not absolutely unnecessary) for the time-of-flight mass spectrometer according to the present invention since it can obtain highly accurate analysis results with reduced influence from the temperature by signal processing, or more specifically, by software-based techniques that can be executed on a computer. This allows the use of a simpler hardware system for temperature compensation, which is advantageous for the cost reduction of the apparatus.

EXPLANATION OF NUMERALS

1 . . . Electrospray Nozzle
2 . . . Ionization Chamber
3 . . . Heating Pipe
4 . . . First Intermediate Chamber
5 . . . First Ion Lens
6 . . . Skimmer
7 . . . Second Intermediate Chamber
8 . . . Second ion Lens
9 . . . Ion Trap Chamber
10 . . . Ion Trap
11 . . . Flight Tube
12 . . . Flight Space
13 . . . Reflectron
14 . . . Detector
15 . . . Vacuum Chamber
16 . . . Ion Trap (IT) Block
17 . . . Holding Member
20 . . . TOF Power Unit
21 . . . IT Control Circuit
22 . . . IT Power Unit
23 . . . Analysis Controller
24 . . . Transfer Function Memory
25 . . . Mass Shift Predicting Operation Section
26 . . . Abnormality Determining Section
27 . . . Enunciator
28 . . . Data Processor
29 . . . Mass Shift Correcting Section
30 . . . Thermostatic Bath
31 . . . Heater
32 . . . Fan
34 . . . First Temperature Sensor
35 . . . Second Temperature Sensor
36 . . . Heater Sensor
37 . . . Temperature Controller

BEST MODE FOR CARRYING OUT THE INVENTION

Figure 1:
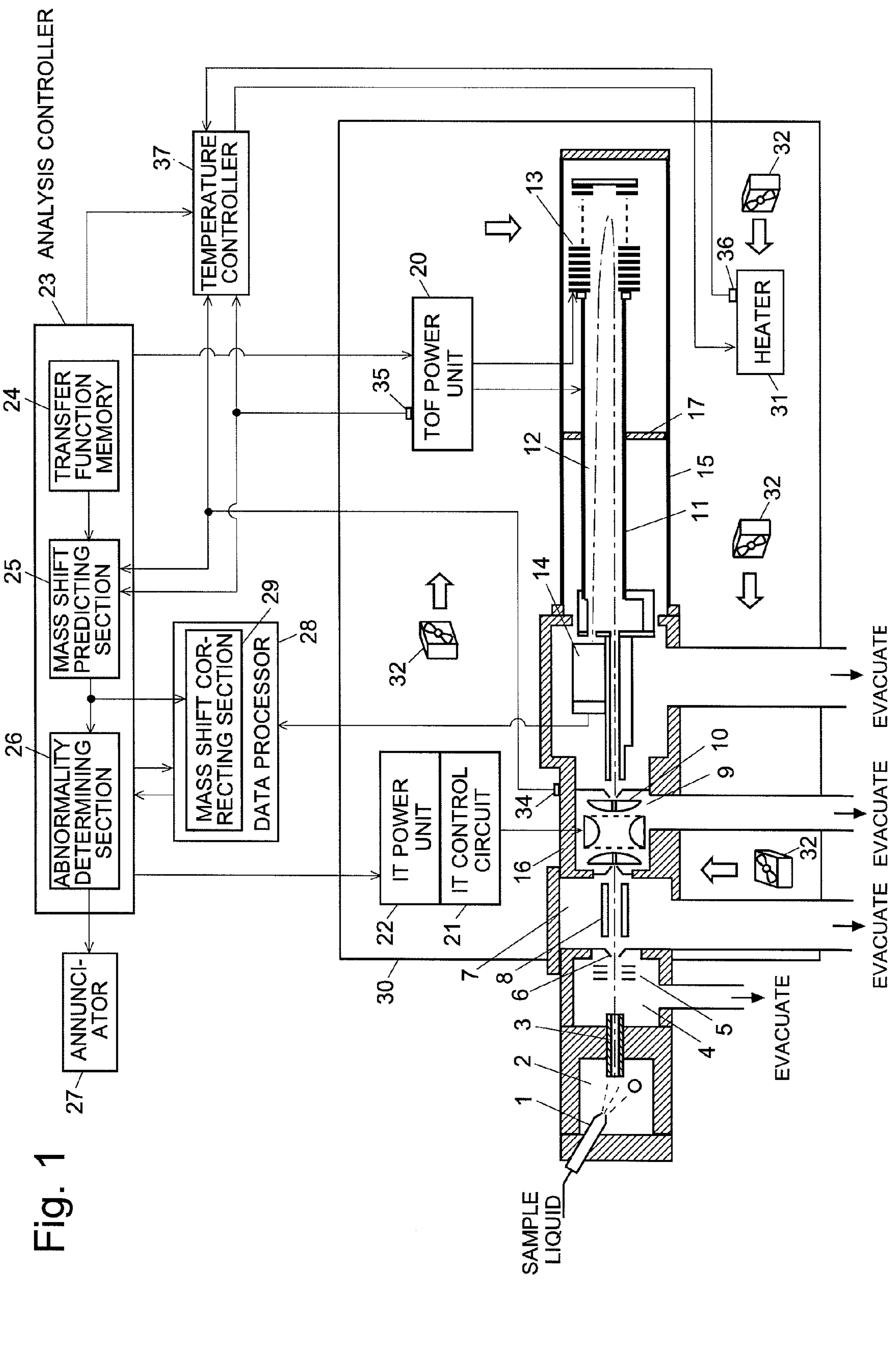
FIG. 1 is a configuration diagram showing the main components of a TOFMS which is an embodiment of the present invention.

A TOFMS, which is an embodiment of the present invention, is hereinafter described with reference to the attached drawings. FIG. 1 is a configuration diagram showing the main components of the TOFMS according to the present embodiment. This TOFMS includes an atmospheric pressure ionization source, an ion trap and a time-of-flight mass analyzer. It can be used, for example, in a liquid chromatograph mass spectrometer (LC/MS) in which a liquid chromatograph connected in the preceding stage.

A sample liquid containing a target component is sprayed from an electrospray nozzle 1 into an ionization chamber 2 at an approximately atmospheric pressure, whereby ions are produced from the objective component. The resulting ions are sent through a heating pipe 3 into a first intermediate vacuum chamber 4, which is evacuated to a low vacuum state by a rotary pump (not shown). Within the first intermediate vacuum chamber 4, the ions are focused by a first ion lens 5 and sent through a skimmer 6 into a second intermediate vacuum chamber 7 which is in an intermediate vacuum state. Within the second intermediate vacuum chamber 7, the ions are focused by a second ion lens 8 consisting of a plurality of rod electrodes, to be introduced into an ion trap chamber 9 which is in a high vacuum state. Inside the ion trap chamber 9, a three-dimensional quadrupole ion trap 10 is provided. The ion trap 10 can temporarily hold ions and then almost collectively eject them to the subsequent stage.

The ions that have been ejected from the ion trap 10 are subsequently introduced into a flight space 12 formed within a flight tube 11. The flight tube is a tubular part made of stainless steel or similar metal. It also acts as an accelerating electrode for imparting initial acceleration energy to the ions by a potential difference relative to the center of the ion trap 10. At one end (right end in FIG. 1) of the flight tube 11, a reflectron 13 is provided. The reflectron 13 creates an electric field, whereby the accelerated ions are reflected back through the flight space 12 and eventually detected by a detector 14.

The ion trap 10, flight tube 11, reflectron 13, detector 14 and other elements are provided within a vacuum container composed of a vacuum chamber 15 and an ion trap (IT) block 15. This vacuum container, which corresponds to the vacuum container in the present invention, is evacuated by a turbo molecular pump capable of creating a high vacuum. The flight tube 11, which is placed inside the vacuum chamber 15, is supported by a holding member 17 made of a material having a low thermal conductivity (e.g. a ceramic or resin). That is, the flight tube 11 is under a vacuum atmosphere.

The vacuum container located behind the second intermediate vacuum chamber 7 is enclosed in a thermostatic bath (temperature-controlled casing) 30. The thermostatic bath 30 contains a temperature controller consisting of a heater 31 with a heater sensor 36, a plurality of fans 32 and other elements are provided. A TOF power unit 20 (which corresponds to the power unit in the present invention) for applying high voltages to the flight tube 11 so as to impart initial acceleration energy to the ions as well as an IT control circuit 21 and an IT power unit 22 for applying voltages to the electrodes of the ion trap 10 are also contained within the thermostatic bath 30 for the purpose of temperature control. On the external surface of the vacuum container, or more specifically the IT block 16, a first temperature sensor 34 for detecting the temperature of the IT block 16 is closely attached. Similarly, a second temperature sensor 35 is attached to the TOF power unit 20 to detect its temperature of this unit.

Under the control of the temperature controller 37, the internal space of the thermostatic bath 30 is controlled so that the temperature detected with the first temperature sensor 34 will be at a predetermined target level (e.g. 40 degrees Celsius). For this temperature control, a method described in Patent Document 1 can be used.

The IT control circuit 21, TOF power unit 20 and other components are comprehensively controlled by an analysis controller 23 for performing a mass analysis. Ion detection signals from the detector 14 are fed to a data processor 28, which creates a mass spectrum. The temperatures detected by the first and second temperature sensors 34 and 35 are also sent to a mass shift predicting operation section 25 (which corresponds to the estimating operation means in the present invention), which is included in the analysis controller 23.

The mass shift predicting operation section 25 estimates, in real time, the shift length of the mass axis of the mass spectrum at a given point in time, using the detected temperatures and differential equations that express transfer functions previously stored in a transfer function memory 24. (This section corresponds to the first and second memory means in the present invention.) The estimated shift length is fed to a mass shift correcting section 29 included in the data processor 28, which corrects the shift of the mass axis of the mass spectrum. An abnormality determining section 26 determines whether the shift length exceeds a tolerance level. If the shift length is found to be greater than the tolerance level, an operation for inviting users' attention is performed by an enunciator 27 (which corresponds to the annunciating means in the present invention). For example, the enunciator 27 may use a display or buzzer sound to invite users' attention.

A portion or the entirety of the functions of the analysis controller 23 and data processor 28 can be configured to be realized by executing a program of a calculating system embedded in the apparatus or a dedicated program installed in a personal computer.

In the TOFMS of the present embodiment, a variety of ions temporarily held in the ion trap 10 are almost collectively ejected and given an initial acceleration energy until they achieve a state of linear uniform motion within the flight tube 11. After flying through the flight space 12, they are reflected by the reflectron 13 and eventually reach the detector 14. The time required for an ion to make this reciprocal motion within the flight space 12 depends on the mass (or m/z, to be exact) of the ion. Therefore, if a variety of ions are almost simultaneously accelerated to initiate their flight, ions having different masses will arrive at the detector at different points in time.

However, if the flight tube 11 expands or contracts due to a temperature change, the flight distance for the ions having the same mass changes. If the flight distance increases, the flight time increases accordingly, so that the mass determined from the flight time for the same kind of ions shifts in the increasing direction on the mass axis of the mass spectrum. That is, a shift of the mass axis occurs. If the high voltage applied to the flight tube 11 fluctuates due to a temperature change of the TOF power unit 20, the initial acceleration energy imparted to the same kind of ions varies, which leads to a shift in their flight time.

Given these problems, the vacuum container and TOF power unit 20 in the present TOFMS are contained in the thermostatic bath 30 to suppress the aforementioned temperature-changing factors. Despite this design, it is still possible that the temperature inside the thermostatic bath 30 cannot be constantly maintained because of, for example, a significant change in the ambient temperature, which causes a temperature change of the vacuum container and/or TOF power unit 20 with a resulting shift of the mass axis. To address this problem, the TOFMS of the present embodiment has the functions of estimating the mass-shift length of a mass spectrum and correcting the shift length in the following manner.

The principle of the correction of the mass shift due to a temperature change in the TOFMS of the present embodiment is hereinafter explained. When the temperature of the IT block 16 (and hence the vacuum chamber) changes, a mass change occurs in the following causal sequence: A temperature change of the IT block 16→a temperature change of the flight tube 11 within the vacuum chamber 15→a change in the length of the flight tube 11→a change in the flight distance within the flight space 12→a change in the flight time of the ions→a change in the mass value. This causal sequence is hereinafter referred to as "factor (A)."

In the case of a temperature change of the TOF power unit 20, a mass change occurs in the following causal sequence: A temperature change of the TOF power unit 20→a change in the characteristics of resistors, transistors and other electrical parts in the TOF power unit 20→a change in the output voltage of the TOF power unit 20→a change in the initial acceleration energy given to the ions by a potential difference between the center of the ion trap 10 and the flight tube 11→a change in the flight time of the ions→a change in the mass value. This causal sequence is hereinafter referred to as "factor (B)."

It is possible to consider that the aforementioned factors (A) and (B) are totally independent from each other and hence contribute to the mass fluctuation independently. For example, in the case of the factor (A), a temperature rise of the IT block 16 causes the flight tube 11 to expand, which increases the flight distance of the ions and makes the flight time longer than the normal length. Consequently, the mass value changes in the plus direction. In the case of the factor (B), a temperature rise of the TOF power unit 20 decreases its output voltage (provided that the power unit has a negative polarity and its temperature characteristic is negative), which increases the initial acceleration energy of the ions. Therefore, the flight time becomes shorter than the normal length, so that the mass value changes in the minus direction.

With the temperature of the IT block 16 denoted by $x_1(t)$ and that of the TOF power unit 20 denoted by $x_2(t)$, their Laplace transformations will be as follows:

$$X_n(s)=\int x_n(t)\cdot e^{-st}dt \quad (1)$$

where n=1 or 2 (also in the subsequent equations) and ∫ is the integral from 0 to ∞. Given that the temporal change of the mass fluctuation due to the temperature change of the IT block 16 and that of the mass fluctuation due to the temperature change of the TOF power unit 20 are respectively denoted by $y_1(t)$ and $y_2(t)$, the Laplace transformations $Y_1(s)$ and $Y_2(s)$ of these variables can be expressed as follows:

$$Y_n(s)=G_n(s)\cdot X_n(s) \quad (2)$$

where $G_n(s)$ is the transfer functions from the temperature change to the mass change for the factors (A) and (B). To simplify the explanation, the transfer function $G_n(s)$ can be approximated by a first-order lag system as follows:

$$G_n(s)=k_n/(1+\tau_n s) \quad (3)$$

where $k_n$ is a proportionality factor of the transformation from the monitored temperature change to the mass change for each of the factors (A) and (B), and $\tau_n$ is a time constant of the transfer function of each of the factors (A) and (B).

In the configuration of the present embodiment, when predicted values of the mass fluctuation are to be calculated using the aforementioned transfer functions by a computation system (firmware program) embedded in the apparatus, it is necessary to transform the analogue system (continuous system) described by equation (3) into a pulse transfer function (z-transformation) of a digital system (discrete system). In the present embodiment, this transformation is performed using the following bilinear z-transformation (4):

$$s=(2/T)\cdot(1-z^{-1})/(1+z^{-1}) \quad (4)$$

In this case, the equation (3) can be rewritten as follows:

$$G_n(z)=k_n a_n(1+z^{-1})/(1+b_n z^{-1}) \quad (5)$$

where $a_n$ and $b_n$ are given by the following equations, with T denoting the sampling period of the discrete system:

$$a_n=T/(T+2\tau_n),\ b_n=(T-2\tau_n)/(T+2\tau_n) \quad (6)$$

In a discrete system, the equation (2) can be written as follows:

$$Y_n(z)=G_n(z)\cdot X_n(z) \quad (7)$$

Using this equation and the equation (5), a differential equation for a digital filter (IIR filter) for realizing the transfer functions of the factors (A) and (B) can be created as follows:

$$y_n[k]=k_n a_n(x_n[k]+x_n[k-1])-b_n y_n[k-1] \quad (8)$$

Under the condition that the contributions of the factors (A) and (B) are independent of each other, it is possible to simply sum up the contribution to the mass fluctuation of the temperature fluctuation of the IT block 16 and that of the temperature fluctuation of the TOF power unit 20. Accordingly, the total mass fluctuation y(t) (or y(k) if expressed in the discrete system) estimated from the two input values $x_1(t)$ and $x_2(t)$ (or $x_1[k]$ and $x_2[k]$ in the discrete system) will be eventually obtained as follows:

$$y(t)=\Sigma y_n(t) \quad (9)$$

$$y[k]=\Sigma y_n[t] \quad (10)$$

where Σ is the sum for n=1 and 2.

An experiment has been conducted to confirm that an accurate mass correction can be made by using the mass fluctuation estimated in the previously described manner. The method and result of this experiment is hereinafter described. In this experiment, the TOFMS shown in FIG. 1 was placed in a large thermostatic bath to forcibly create a sudden change in the ambient temperature (room temperature). Within the due temperature range for the operation of the TOFMS (from 18° to 28° C.), the temperature was changed from 28° C. to 18° C. and then back to 28° C. Meanwhile, measurements were made to record temperature fluctuations of the first temperature sensor 34 and second temperature sensor 35 as well as a change in the peak value of a mass spectrum of a standard sample (TFA sodium).

Figure 2:
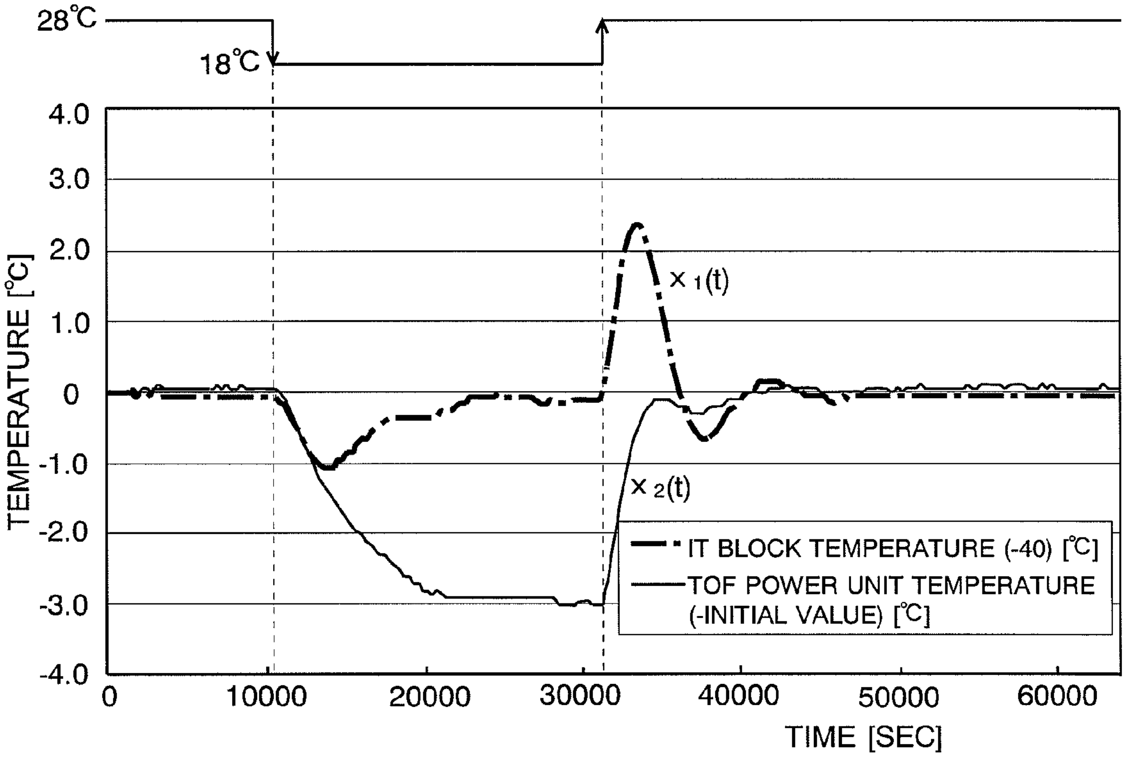
FIG. 2 is a graph showing measured values of the temperature fluctuation histories $x_1(t)$ and $x_2(t)$ of an IT block and TOF power unit which were recorded when the environmental temperature was changed in a step-like form.

The temperature fluctuation history $x_1(t)$ of the IT block 16 and the temperature fluctuation history $x_2(t)$ of the TOF power unit 20 were measured under the condition that the environmental temperature was suddenly (i.e. in a step-like form) changed from 28° C. to 18° C. after three hours (10,800 seconds) from the measurement start point and then from 18° C. back to 28° C. after eight hours forty-five minutes (31,500 seconds). The result is shown in FIG. 2. The reference points (zero points) for the temperature changes of the IT block 16 and TOF power unit 20 were their respective temperatures at the measurement start point; specifically, they were 40° C. for the former and 42.8° C. for the latter. FIG. 2 demonstrates that, in the case of a sudden change in the environmental temperature, the temperatures of the IT block 16 and TOF power unit 20 will fluctuate to a maximum extent of 2° to 3° C. even though they are contained in the thermostatic bath 30. These fluctuations cause a mass shift.

Figure 3:
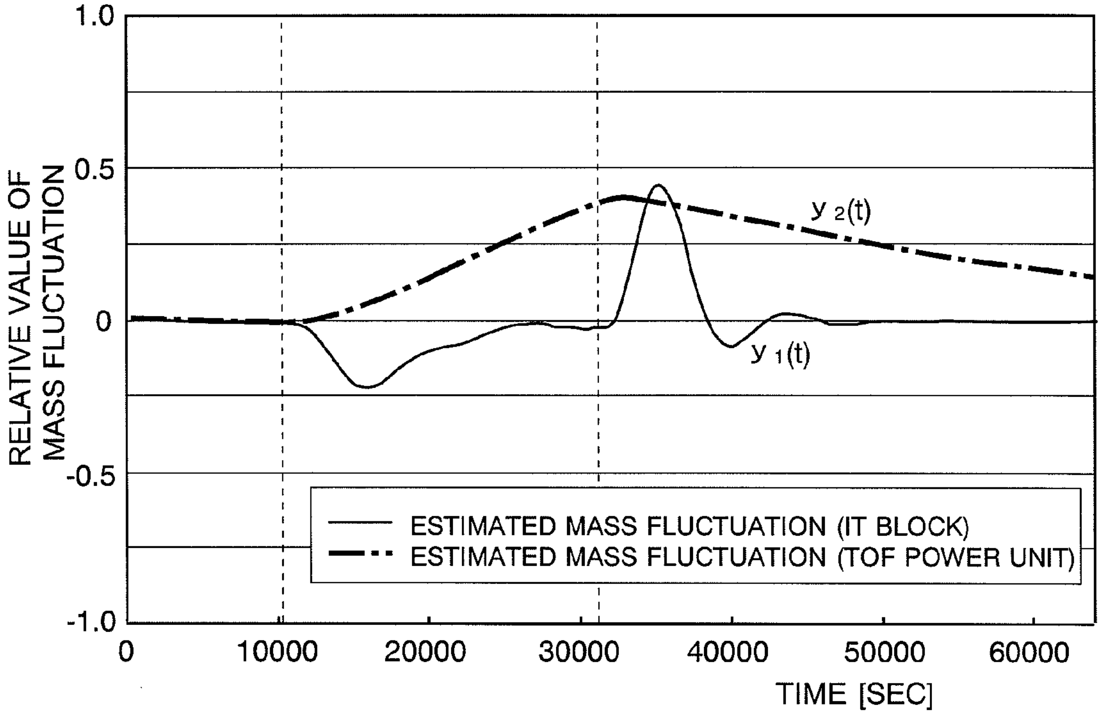
FIG. 3 is a graph showing the result of a calculation of predicted values $y_1(t)$ and $y_2(t)$ of the mass fluctuations for the temperature fluctuation shown in FIG. 2.
Figure 4:
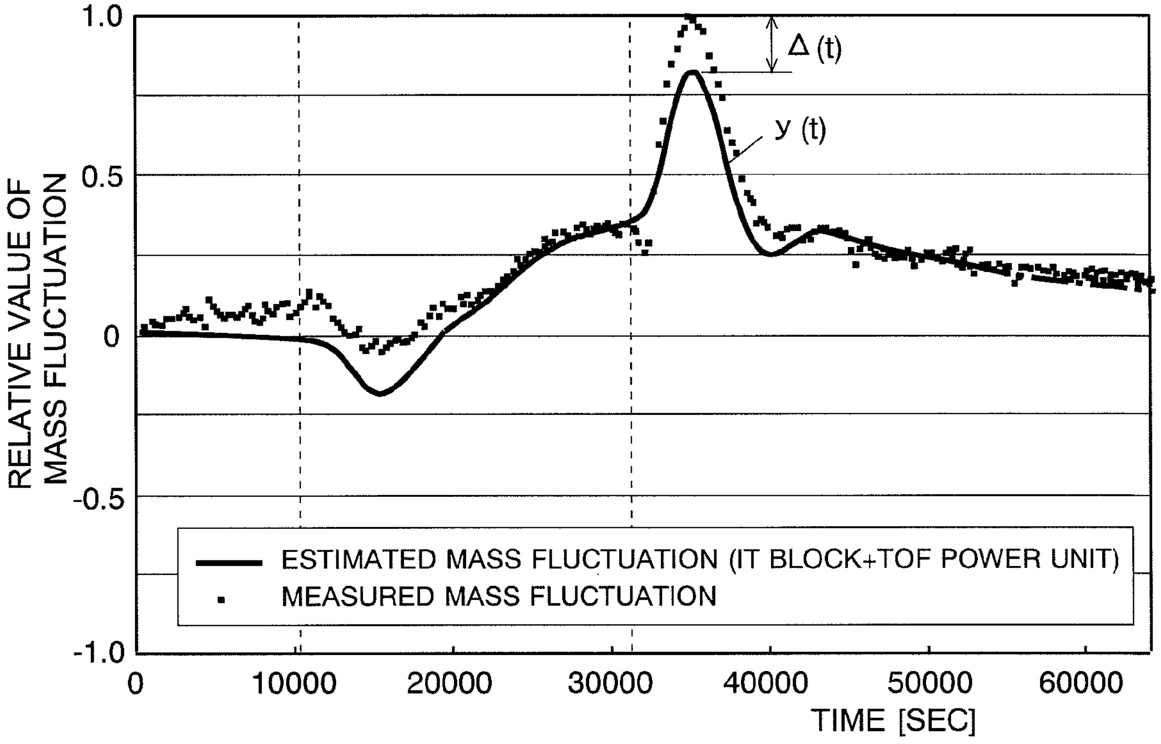
FIG. 4 is a graph showing the sum $y_1(t)+y_2(t)$ of the predicted values of the mass fluctuation shown in FIG. 3 and the measured values of the mass fluctuation.

A filtering process using an IIR filter, which realized the pulse transfer function shown by equation (5) with appropriate values assigned to the parameters $k_n$ and $\tau_n$, was performed on each of the temperature fluctuation history $x_1(t)$ of the IT block 16 and the temperature fluctuation history $x_2(t)$ of the TOF power unit 20 to calculate the predicted values $y_1(t)$ and $y_2(t)$ of the mass fluctuation, the result of which is shown in FIG. 3. FIG. 4 is a graph showing the sum of the predicted values of mass fluctuation, i.e. $y_1(t)+y_2(t)$, and the measured values of mass fluctuation. The vertical axes of FIGS. 3 and 4 show relative values of the mass fluctuation which are normalized so that the maximum value (or peak value) of the measured mass fluctuation in FIG. 4 equals one.

The values of the proportionality factor $k_n$ and time constant $\tau_n$ used as the parameters of the aforementioned transfer function were selected so as to minimize the difference between the fluctuation value of the actually obtained mass spectrum (the peak at m/z=702.9 in the standard sample) and the sum y(t) of $y_1(t)$ and $y_2(t)$. In actual calculations, however, the time constant $\tau_A$ (=1/$\omega_A$), which is a parameter of the IIR filter, has a value that has been subjected to an analogue-to-digital correction by a pre-warp correction equation of $\omega_A=2/T\cdot\tan(\omega_D T/2)$. This correction equation is intended to compensate for the difference between the analogue filter and digital filter, which inevitably occurs since the bilinear z-transformation is nothing more an approximation. By taking this difference into account beforehand when designing a digital filter, one can use a digital filter to obtain a result that satisfies the specifications for a given time constant (cutoff frequency) as in the case of an analogue filter. Specifically, this can be achieved by designing the IIR filter by calculating the parameter $\omega_A$ from the specified value of $\omega_D=1/\tau_D$ [rad/s] and applying the calculated value in equation (5).

The difference Δ(t) between the measured value and the predicted value y(t) of the mass fluctuation is the mass error that remains uncorrected even by the method of the present embodiment. As is evident from FIG. 4, the predicted result considerably approximates to the actual mass fluctuation when the mass fluctuation due to the temperature fluctuation of the TOF power unit 20 is considered as well as the mass fluctuation due to the temperature fluctuation of the IT block 16. Specifically, the maximum mass error within the measured range has been reduced to approximately one third or less of the value achieved in the case of predicting the mass fluctuation by only taking into account the mass fluctuation due to the temperature fluctuation of the IT block 16 (i.e. by performing a filtering operation that uses its transfer function). Therefore, it is possible to improve the mass accuracy to be more than tripled by correcting the mass axis of the mass spectrum based on the present prediction.

For actual apparatuses, appropriate values of the parameters $k_n$ and $\tau_n$ are determined by an experiment in the previously described manner and stored beforehand in the transfer function memory 24. These parameters do not significantly depend on the individual difference of the apparatuses and hence can be preset by a maker to supply the present apparatus. Accordingly, it is unnecessary for users of this TOFMS to perform a measurement for determining those parameters. However, it is also possible to design the apparatus so that a user (or a maintenance technician who has received a request from a user) can calibrate it afterward.

When a mass analysis is performed with this TOFMS, the temperature values obtained by the first and second temperature sensors 34 and 35 are continuously fed to the mass shift predicting operation section 25. Using these monitored values of the two temperatures and the aforementioned parameters stored in the transfer function memory 24, the mass shift predicting operation section 25 performs the previously described sequential computation to estimate the current shift length of the mass axis. The time required for this computation is adequately shorter than that for a temperature change to affect the analysis. Therefore, it is possible to predict, in substantially real time, the actually existing mass shift. In the data processor 28, the mass shift correcting section 29 corrects the mass axis of a mass spectrum created from the obtained data, using the mass shift length that has been accurately predicted by the aforementioned method. Meanwhile, the abnormality determining section 26 determines whether the estimated value of the mass shift length is smaller than a tolerance level. If the estimated value exceeds the tolerance level, it drives the enunciator 27 to invite users' attention, for example, by a display.

Thus, if the temperature of the air inside the thermostatic bath 30 changes due to a sudden change in the ambient temperature or for other reasons, the TOFMS of the present embodiment can reduce the shift of the mass axis of the mass spectrum to obtain a mass spectrum with a high level of mass accuracy.

The previously described embodiment is a mere example of the time-of-flight mass spectrometer according to the present invention, and any change, modification or addition appropriately made within the spirit of the present invention will be included in the scope of the claims of this patent application.

For example, it is evident that the present invention is applicable not only to a reflectron type as in the previous embodiment but also to a linear type or any other type of time-of-flight mass spectrometer having a different form of flight path. The ion trap used in the apparatus of the embodiment is merely an optional element for the present invention. The ion source is not limited to atmospheric pressure ion sources; it is possible to use a MALDI or any other type of ion source.

The invention claimed is:

1. A time-of-flight mass spectrometer in which a mass separation unit forming a flight space designed for ions to fly through, an accelerating electrode for initially accelerating the ions and a detector for detecting the ions are provided within an evacuated vacuum container, where the ions that are initially accelerated by the accelerating electrode and temporally separated according to their mass by flying through the flight space are detected by the detector and a mass spectrum having a mass axis and an intensity axis is created from a detection signal of the ion detector, which is characterized by comprising:

a) a first temperature detecting means for detecting a temperature of the vacuum container;

b) a second temperature detecting means for detecting a temperature of a power unit for applying a voltage to the accelerating electrode;

c) a first memory means for storing information based on a result of a previous measurement relating to a transfer function from a temperature change of the vacuum container and a shift of the mass axis due to a temperature change of the mass separation unit;

d) a second memory means for storing information based on a result of a previous measurement relating to a transfer function from a temperature change of the power unit and a shift of the mass axis due to a temperature characteristic of an output of the power unit; and e) an estimating operation means for estimating a current shift length of the mass axis by using current temperatures of the vacuum chamber and the power unit obtained with the first temperature detecting means and the second temperature detecting means as well as information relating to the transfer functions stored in the first memory means and the second memory means, respectively.

2. The time-of-flight mass spectrometer according to claim 1, which is characterized in that each of the two transfer functions is respectively obtained by measuring a step response of the shift length of the mass axis of the mass spectrum to a substantially step-like change in the temperature of the vacuum container and the power unit.

3. The time-of-flight mass spectrometer according to claim 2, which is characterized in that the information relating to each of the transfer functions stored in the first memory means and the second memory means includes both a proportionality factor of transformation from the monitored temperature change to the mass change and a time constant of the transfer function.

4. The time-of-flight mass spectrometer according to claim 1, which is characterized in that the information relating to each of the transfer functions stored in the first memory means and the second memory means includes both a proportionality factor of transformation from the monitored temperature change to the mass change and a time constant of the transfer function.

5. The time-of-flight mass spectrometer according to claim 1, which is characterized in that the estimating operation means estimates a total shift length of the mass axis by summing up the current shift length of the mass axis estimated using the current temperature of the vacuum container obtained with the first temperature detecting means as well as the information relating to the transfer function stored in the first memory means, and the current shift length of the mass axis estimated using the current temperature of the power unit obtained with the second temperature detecting means as well as the information relating to the transfer function stored in the second memory means.

6. The time-of-flight mass spectrometer according to claim 1, which is characterized by further comprising a data processing means for creating a mass spectrum with a corrected mass axis, using the shift length of the mass axis estimated by the estimating operation means.

7. The time-of-flight mass spectrometer according to claim 1, which is characterized by further comprising an annunciating means for informing users if the shift length of the mass axis estimated by the estimating operation means exceeds a predetermined tolerance level.

* * * * *